(12) United States Patent
Zoppitelli et al.

(10) Patent No.: US 9,079,660 B2
(45) Date of Patent: Jul. 14, 2015

(54) ROTOR DAMPER DEVICE, AND AN ASSOCIATED ROTOR AND AIRCRAFT

(75) Inventors: Elio Zoppitelli, Cabries (FR); Etienne Rampal, Marseilles (FR)

(73) Assignee: Airbus Helicopters, Marignane Cedex (FR)

( * ) Notice: Subject to any disclaimer, the term of this patent is extended or adjusted under 35 U.S.C. 154(b) by 636 days.

(21) Appl. No.: 13/440,143

(22) Filed: Apr. 5, 2012

(65) Prior Publication Data

US 2012/0269630 A1 Oct. 25, 2012

(30) Foreign Application Priority Data

Apr. 20, 2011 (FR) ..................... 11 01232

(51) Int. Cl.
| | | |
|---|---|---|
| *B64C 27/32* | (2006.01) | |
| *B64C 27/51* | (2006.01) | |
| *B64C 27/35* | (2006.01) | |
| *B64C 27/635* | (2006.01) | |
| *B64C 27/00* | (2006.01) | |

(52) U.S. Cl.
CPC ............. *B64C 27/51* (2013.01); *B64C 27/35* (2013.01); *B64C 27/635* (2013.01); *B64C 2027/003* (2013.01)

(58) Field of Classification Search
CPC ...... B64C 27/51; B64C 27/54; B64C 27/635; B64C 27/35; B64C 2027/003
USPC ........................... 416/103–107, 500
See application file for complete search history.

(56) References Cited

U.S. PATENT DOCUMENTS

| | | | | |
|---|---|---|---|---|
| 3,999,887 A | * | 12/1976 | McGuire | ................... 416/134 A |
| 4,249,862 A | * | 2/1981 | Waddington et al. | ..... 416/134 A |
| 4,297,078 A | | 10/1981 | Martin | |
| 4,915,585 A | | 4/1990 | Guimbal | |
| 5,004,215 A | | 4/1991 | Aubry | |
| 5,372,478 A | * | 12/1994 | McCafferty | .................. 416/106 |
| 5,636,970 A | | 6/1997 | Certain | |
| 7,607,892 B2 | | 10/2009 | Beroul | |
| 2009/0180882 A1 | | 7/2009 | Stille | |
| 2010/0308155 A1 | | 12/2010 | Nakao | |

FOREIGN PATENT DOCUMENTS

| | | |
|---|---|---|
| EP | 0340095 B1 | 1/1992 |
| EP | 0742144 A1 | 11/1996 |
| EP | 1767452 A1 | 3/2007 |
| EP | 2233397 A1 | 9/2010 |
| FR | 2373445 A1 | 7/1978 |
| FR | 2629163 A1 | 9/1989 |
| FR | 2890937 A1 | 3/2007 |
| GB | 947683 A | 1/1964 |

OTHER PUBLICATIONS

Search Report and Written Opinion; Application No. FR 1101232; dated Nov. 15, 2011.

* cited by examiner

*Primary Examiner* — Dwayne J White
*Assistant Examiner* — Jason Fountain
(74) *Attorney, Agent, or Firm* — Brooks Kushman P.C.

(57) ABSTRACT

A damper device (10) for a rotor (2) having a rotary ring (11) and a plurality of levers (12), each lever (12) extending from a first end (12') connected to the ring (11) by a first mechanical connection (20) to a second end (12") suitable for being hinged to a blade (4). The damper device (10) includes non-rotary damper means (30) secured to non-rotary fastener means (40) and to a non-rotary member (51) of an interface (50), the interface (50) being interposed between the non-rotary damper means (30) and the ring (11) to convert a rotary movement of a blade (4) transmitted to a lever (12) into a movement in translation acting on the damper means (30).

14 Claims, 4 Drawing Sheets

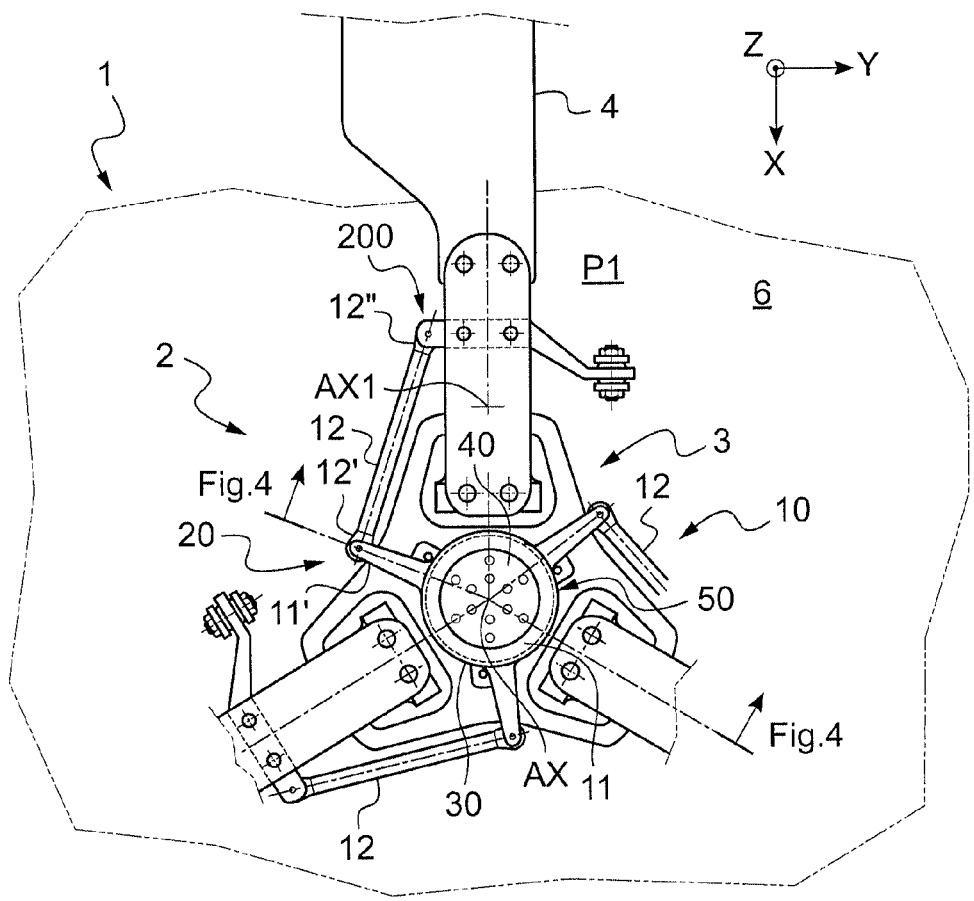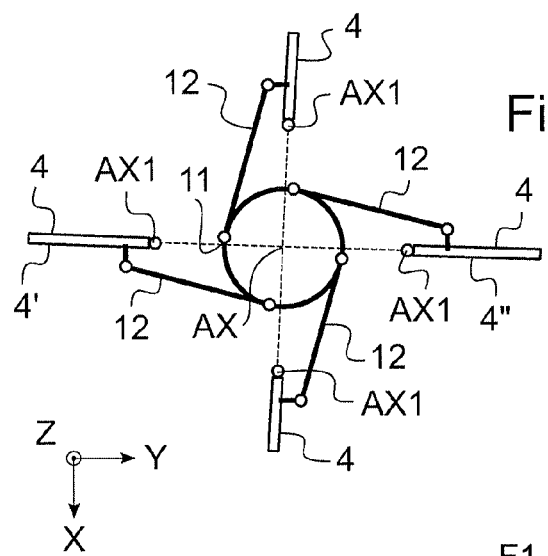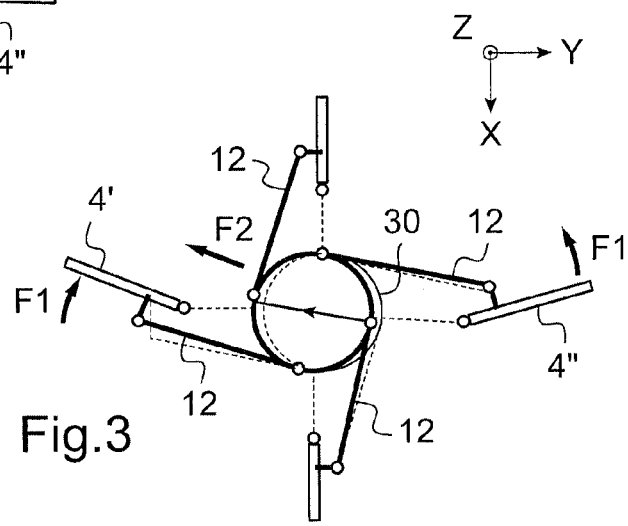

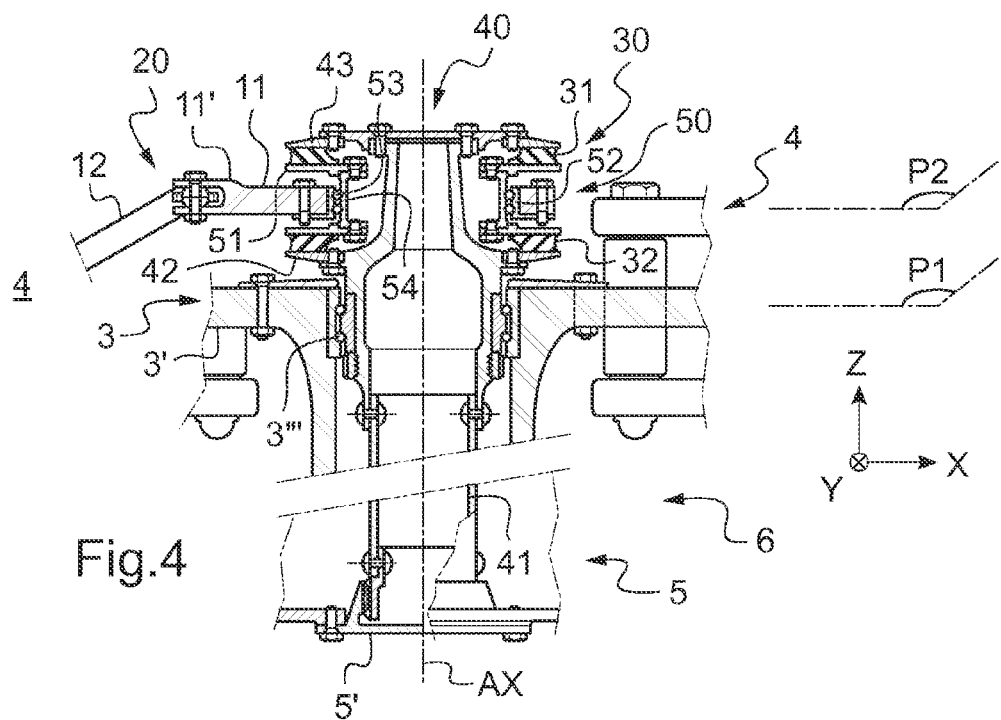
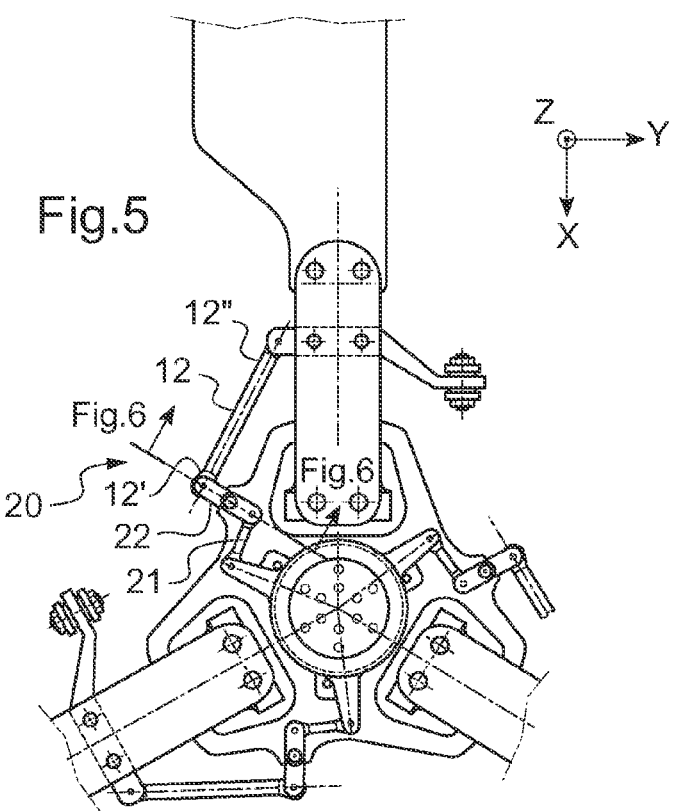

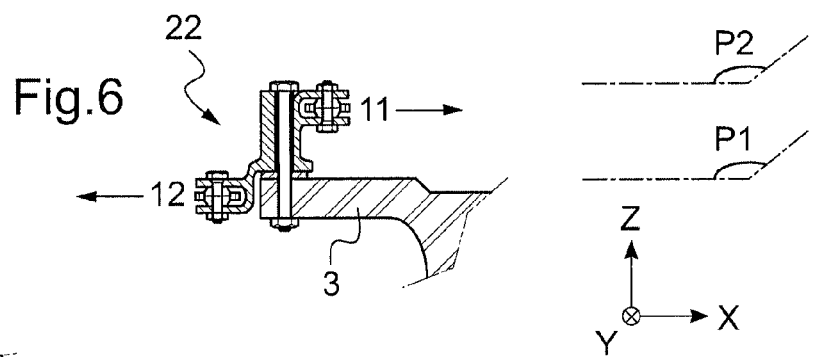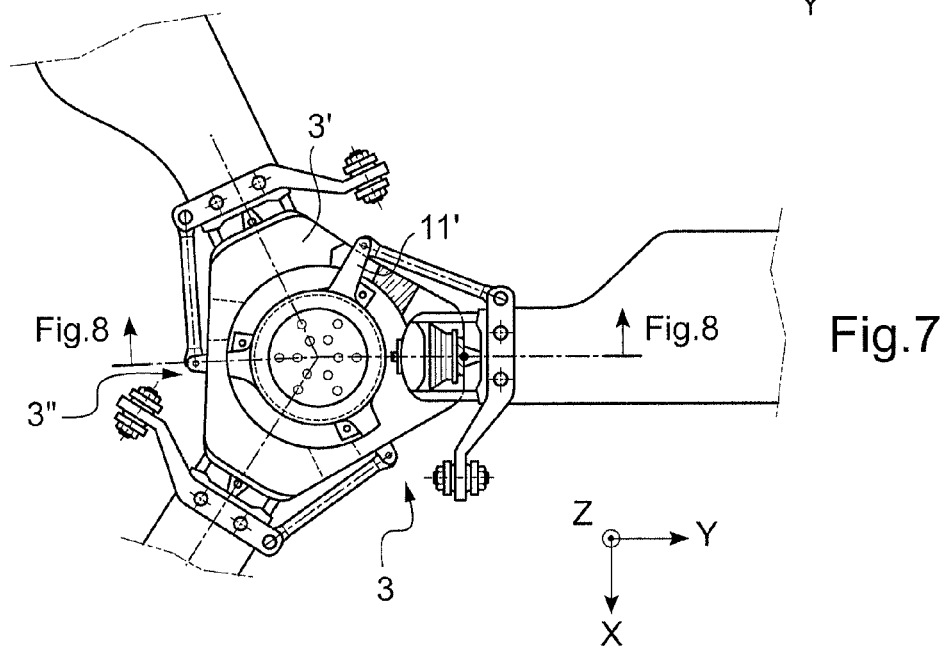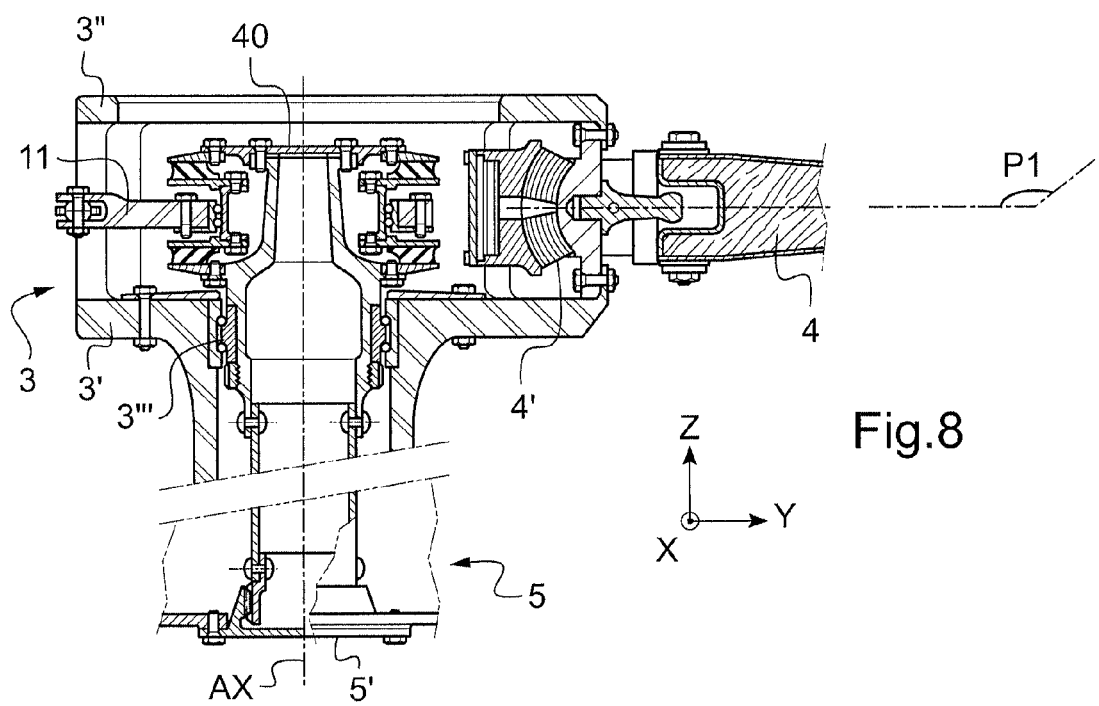

ROTOR DAMPER DEVICE, AND AN ASSOCIATED ROTOR AND AIRCRAFT

CROSS REFERENCE TO RELATED APPLICATIONS

The present application claims priority to French patent application FR 11/01232 filed on Apr. 20, 2011, the content of which is incorporated in its entirety by reference herein.

BACKGROUND OF THE INVENTION (1) Field of the Invention

The present invention relates to a device for damping a rotor, and also to an associated rotor and aircraft.

The invention relates in particular to rotorcraft rotors comprising a hub that is driven in rotation about an axis of rotation by an outlet shaft from a main gearbox, together with a plurality of blades that are fastened to the hub by means of appropriate hinges. Such rotors are said to be "articulated rotors".

(2) Description of Related Art

The oscillations of each blade about its lead-lag axis can become coupled in unstable manner with the movements or the elastic deformation modes of the airframe, with the lead-lag oscillations of a blade being the result of the natural response and of the forced response of said blade. In particular, the oscillations of a helicopter standing on the ground on its landing gear while its rotor is turning can give rise to a phenomenon known as "ground resonance".

During lead-lag excitation of the blades of a rotor, the blades move away from their equilibrium positions in accordance with their natural and forced responses, and they may become unevenly distributed in a circumferential direction. This gives rise to an unbalance by shifting the center of gravity of the rotor away from its axis of rotation.

A blade that is offset from its equilibrium position oscillates about the equilibrium position at a frequency $\omega_\delta$, which is the resonant frequency of the blade in its lead-lag motion, also referred to as its first lead-lag mode, or its resonant mode of lead-lag vibration. This frequency $\omega_\delta$ is relative to a rotary system of axes associated with the rotor, in application of definitions given below.

If $\Omega$ is the angular frequency of the rotation of the rotor, it is known that the fuselage of the helicopter is thus excited at the angular frequencies $|\Omega \pm \omega_\delta|$.

When standing on the ground via its landing gear, the fuselage of the helicopter constitutes a mass system that is suspended above the ground by a spring and a damper via each of its undercarriages. The fuselage standing on its landing gear thus presents resonant modes of vibration in roll and in pitching. There is a risk of instability on the ground when the excitation frequency of the rotor on the landing gear is close to the resonant frequency of oscillation $|\Omega \pm \omega_\delta|$ or $|\Omega - \omega_\delta|$ that corresponds to the phenomenon known as ground resonance.

In general, this phenomenon occurs in the presence of only the single resonant frequency of oscillation $|\Omega - \omega_\delta|$ that is said to be "regressive", since it relates to the so-called "regressive" resonant frequency of lead-lag vibration of the blades. This resonant frequency of oscillation is relative to a system of stationary axes associated with the rotorcraft, as explained below.

In order to avoid instability, it is known to begin by seeking to avoid these frequencies crossing each other, and/or, particularly if such a crossing is expected, it is known to provide sufficient damping of the fuselage on its landing gear and/or of the blades of the main rotor in their lead-lag motion. It is also possible to seek to have these frequencies cross at low speed.

Furthermore, other potential frequency crossings are observed in flight that lead to a resonance phenomenon at lower energy levels that is known as "air resonance".

(2) Description of Related Art

Devices are already known for avoiding the above-mentioned instabilities in flight and for avoiding them in part on the ground with the rotor rotating, which devices are useful only during short stages of rotor operation.

For example, according to document FR 2 629 163, it is possible to arrange a resilient return strut on a rotor, which struts may be relatively complex.

According to document EP 0 340 095, a resilient return damper is arranged between two adjacent blades of a rotor.

Document EP 0 742 144 suggests using a lead-lag damper connected to a blade and to an adjacent blade, and also to the hub of the rotor via multiple levers.

Documents FR 2 890 937 and EP 1 767 452 seek to provide a rotorcraft rotor having a lead-lag damper system fastened to a lateral projection from each blade by means of a ball joint close to the pitch rod of the blade.

Document EP 2 233 397 describes an active device that acts on the lead-lag angle of a blade.

It should be observed that those devices making use of a plurality of dampers co-operating with the blades of a rotor may need to be matched. It will be understood that it is difficult or even impossible to fabricate dampers that are strictly identical. Under such circumstances, if the dampers of a device possess characteristics that are relatively far apart, those dampers may themselves give rise to unbalance being created.

The person skilled in the art therefore sometimes tends to match dampers in order to reduce that risk.

Furthermore, the dampers are stressed under dynamic conditions such that they are subjected to heating, thereby reducing their effectiveness and shortening their lifetime.

Thus, the movements of the blades of an articulated rotor of a rotorcraft tend to move the center of gravity of the rotor during each revolution. Such a movement is due to lead-lag movements of the blades under the effect of the natural response of the blades to an impact and the forced response of the blades to excitation taking place at a given frequency. In order to avoid the rare appearance of destructive phenomena of the ground resonance type or of the air resonance type, for example, the prior art includes passive devices that are relatively complicated and active devices that require energy to be supplied to them.

Document GB 947 683 discloses actuators that act on the movements of the blades.

Documents U.S. Pat. No. 5,372,478, U.S. Pat. No. 4,297, 078, FR 2 373 445, and US 2009/180882 are also known.

BRIEF SUMMARY OF THE INVENTION

An object of the present invention is thus to propose a device that is simple for the purpose in particular of limiting the risk of the appearance of the ground resonance phenomenon or indeed of the air resonance phenomenon.

According to the invention, a rotor damper device has a rotary ring and a plurality of levers, each lever extending from a first end connected to said ring by a first mechanical connection to a second end suitable for being hinged to a blade.

Thus, when the damper device is installed on a rotor, the ring is constrained to rotate with the blades of the rotor about an axis of rotation of the rotor. It can thus be understood that the adjective "rotary" is used to qualify an element that is driven in rotation. By way of example, a rotary element is secured to a rotary frame of reference associated with the rotor, whereas a non-rotary element is secured to a stationary frame of reference associated with a structure, e.g. the structure that carries the rotor of the aircraft.

This damper device is remarkable in particular in that it includes non-rotary damper means secured to non-rotary fastener means and to a non-rotary member of an interface, the interface being interposed between the non-rotary damper means and the ring to convert a rotary lead-lag movement of a blade into a movement in translation acting on said damper means.

Under such circumstances, single damper means operate in a frame of reference that is stationary and not in the rotary frame of reference of a rotor provided with the damper device, the damper device thus being acted upon by an interface that performs movements in translation.

By using single damper means connected to all of the blades instead of a plurality of dampers, the invention is unaffected by the above-mentioned problems of matching dampers.

Furthermore, when the damper device is arranged on a rotor, the lead-lag movements of the blades are communicated to the ring by the levers of the damper device, the ring possessing two degrees of freedom to move in translation and one degree of freedom to move in rotation about the axis of rotation of the rotor. The ring communicates its movement in translation to the interface, which then acts on the damper means in translation only.

The alternating lead-lag motion of the blades resulting from the forced response of the blades that is modulated once every revolution (and is generally said to be "1Ω" motion) is converted into a quasi-static movement of the non-rotary member of the interface and thus of the damper means. The damper means respond by generating a force that is proportional to its static stiffness.

Under such circumstances, the force generated by the damper means subjected to 1Ω alternating motion does not present an energy-dissipating component but rather an elastic component that is proportional to the static stiffness of the damper means and not to the dynamic stiffness of the damper means.

Static action on the damper means does not lead to it becoming heated, unlike certain dampers used in the prior art.

That makes it possible to use damper means that are very stiff on heavy helicopters, for example, for which greater conicity leads to accentuated lead-lag movements. Such an implementation is favorable to avoiding any risk of the ground resonance phenomenon appearing under such circumstances.

Furthermore, the lead-lag movements of the blades corresponding to the natural response of the blades are converted into a movement in translation on a circular path at the angular frequency of the resonant mode of regressive lead-lag vibration of the blades. Consequently, these lead-lag movements corresponding to the natural response of the blades are damped by the damper means, the natural frequency of the blades then being affected.

Thus, the invention uses single damper means for all of the blades of a rotor, with non-collective lead-lag movement of the blades tending to move the damper means in translation in a plane via a ring and an interface. On being acted upon by said interface, the damper means deliver static stiffness and damping to the lead-lag motion of the blades, the static stiffness being delivered as a result of lead-lag motion of the blades as generated by the forced response of the blades to excitation produced at the frequency of rotation of the rotor, and with the damping of the damper means being delivered as a result of lead-lag movements of the blades generated by the natural response of the blades to an impact. Furthermore, the damper means modify the resonant frequency of the lead-lag motion of the blades, thereby enabling the dynamic behavior of the rotor to be matched to the dynamic behavior of the structure on its landing gear.

The damper device may also include one or more of the following additional characteristics.

For example, the interface includes a rolling bearing provided with a first cage constrained to rotate with said ring and a second cage that is not rotary, said second cage representing said non-rotary member secured to said damper means, rolling members being arranged between said first cage and said second cage. The rolling members may for example be balls or rollers.

As a result, rotary motion of the ring about the axis of rotation of a rotor is not transmitted to the non-rotary member of the interface and thus is not transmitted to the damper means. Conversely, movement in translation of the ring is transmitted to the non-rotary member of the interface and is thus transmitted to the damper means.

Furthermore, in one aspect of the invention, it should be observed that the damper means comprise a viscoelastic member. For example, the damper means may be provided with one or more layers of elastomer-based materials working in shear between the non-rotary member of the interface and the non-rotary fastener means.

In a variant, the damper means comprise a friction system or indeed a hydraulic system or even a magneto-rheological system, for example.

In a variant, the damper means comprise at least one damping annulus, the annulus being arranged between the interface and the non-rotary fastener means, each annulus advantageously being centered on the axis of rotation of a rotor.

Furthermore, each annulus may be parallel to the ring of the damper device and to a fastening plane of the blades of a rotor. It should be observed that the term "fastening plane" is used for convenience to designate the plane containing the hinges connecting the blades to the hub of a rotor.

For example, the damper means comprise a top annulus and a bottom annulus arranged on either side in elevation of the ring of the damper device, the top annulus being above the ring.

The damper means then present optimized balance.

In another aspect, at least one mechanical connection comprises an arm for projecting radially from the ring in order to facilitate arranging the lever.

Furthermore, at least one mechanical connection comprises a connecting rod hinged to the ring and a rocker member hinged to the connecting rod and to the first end of a lever. If the ring is arranged in a plane parallel to the blade fastening plane, then the rocker member may extend in elevation so as to connect a lever arranged in the fastening plane to a ring arranged in a plane that is distinct from the fastening plane.

In addition to a damper device, the invention also provides a rotor provided with a hub carrying a plurality of blades to rotate about an axis of rotation in elevation, the blades being hinged to the hub by hinges arranged in a fastening plane, the rotor having a damper device of the invention.

Thus, the rotor includes a damper device provided with a rotary ring that rotates about the axis of rotation of the rotor and with one lever per blade, each lever extending from a first end connected to the ring by a first mechanical connection to a second end hinged to a blade, the damper device comprising damper means that are not rotary about the axis of rotation, the damper means being secured to non-rotary fastener means and to a non-rotary member of an interface, the interface being interposed between the damper means and the ring in order to convert rotary movement of at least one blade into movement in translation acting on the damper means.

The rotor may also possess one or more of the following characteristics.

For example, the ring may optionally be parallel to the blade fastening plane.

In another aspect, said hub has a top plate and a bottom plate for carrying the blades in the fastening plane, and the ring is arranged in said fastening plane. The ring is then arranged inside the hub between the top plate and the bottom plate. Likewise, the damper means may be arranged between the top plate and the bottom plate.

Furthermore, the damper means are advantageously centered on the axis of rotation of said rotor.

The invention also provides an aircraft comprising an airframe and a rotor provided with a hub carrying a plurality of blades to rotate about an axis of rotation in elevation, the blades being hinged to the hub by hinges that are arranged in a fastening plane, the rotor being of the above-described type.

The rotor thus includes a damper device of the invention provided with a rotary ring that rotates about the axis of rotation and with one lever per blade, each lever extending from a first end connected to said ring by a first mechanical connection to a second end hinged to a blade, the damper device comprising non-rotary damper means that are secured to non-rotary fastener means fastened to the airframe and to a non-rotary member of an interface, the interface being interposed between the damper means and the ring in order to convert rotary movement of at least one blade into movement in translation in a plane parallel to the fastening plane, thereby acting on said damper means. The term "parallel to the fastening plane" is used to mean either a plane that coincides with the fastening plane or a separate plane that is parallel thereto.

Optionally, the airframe includes a gearbox driving the hub in rotation about the axis of rotation, e.g. the so-called "main" gearbox of a rotorcraft. The fastener means may then be provided with a pole that is fastened to a casing of the main gearbox.

BRIEF DESCRIPTION OF THE SEVERAL VIEWS OF THE DRAWINGS

The invention and its advantages appear in greater detail from the following description of embodiments given by way of illustration and with reference to the accompanying figures, in which:

FIG. 1 is a plan view of a first embodiment of the invention;

FIGS. 2 and 3 are diagrams explaining the operation of the invention;

FIG. 4 is a section of FIG. 1;

FIGS. 5 and 6 are views showing a variant of the mechanical connection connecting a lever to a ring;

FIGS. 7 and 8 are a plan view and a section view of a second embodiment of the invention.

DETAILED DESCRIPTION OF THE INVENTION

Figure 9:
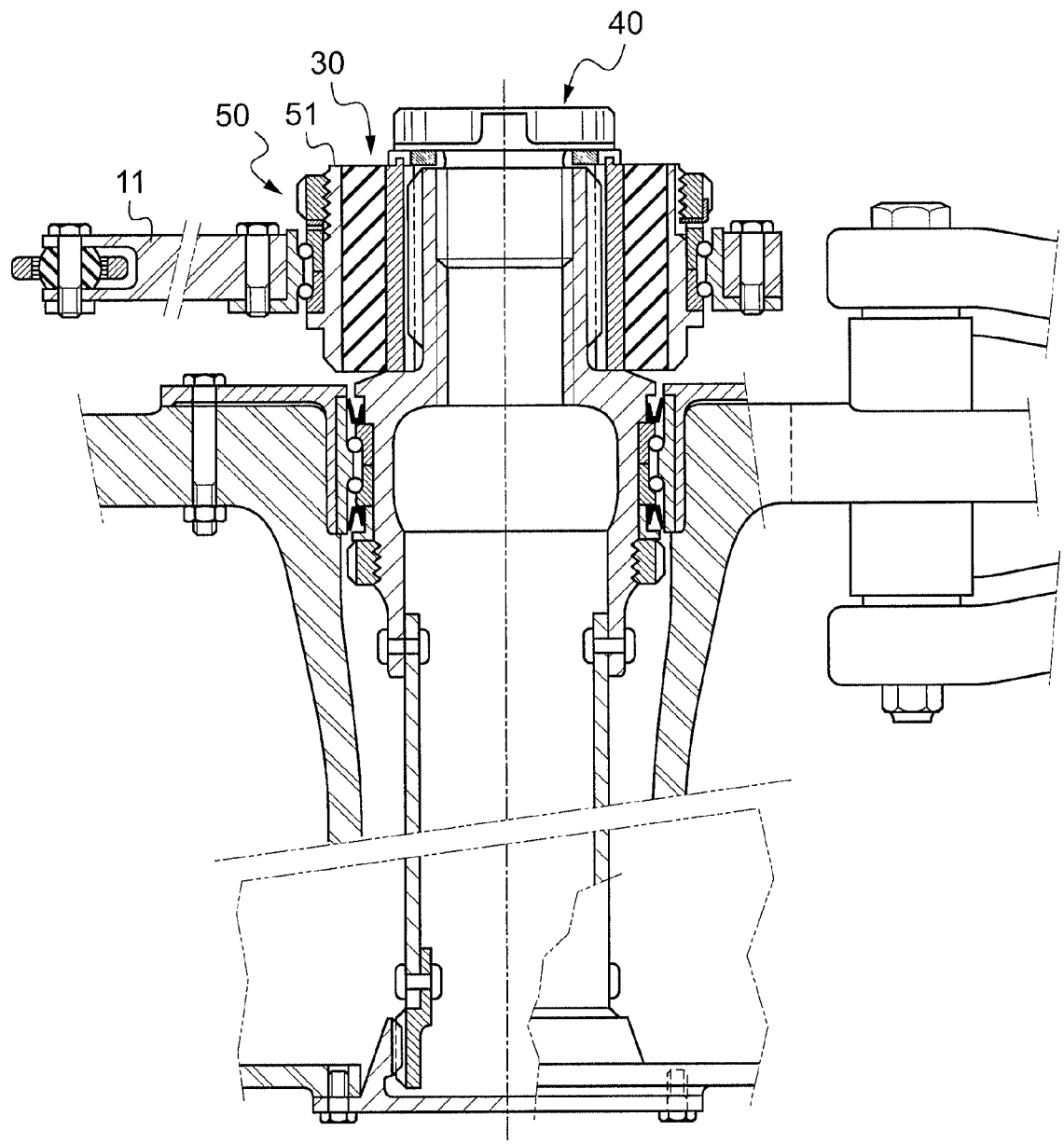
FIG. 9 is a section view of a variant of the invention.

It should be observed that three mutually orthogonal axes X, Y, and Z are shown in the figures.

The first axis X is said to be longitudinal. The term "longitudinal" relates to any direction parallel to the first axis X.

The second axis Y is said to be transverse. The term "transverse" relates to any direction parallel to the second axis Y.

Finally, the third axis Z is said to be in elevation. The term "in elevation" relates to any direction parallel to the third axis Z.

FIG. 1 shows an aircraft 1 having an airframe 6 and a rotor 2, namely an articulated rotor. For manifest reasons of simplifying the drawing, the airframe is represented in extremely diagrammatic manner.

The rotor 2 is provided with a hub 3 carrying a plurality of blades 4, each blade 4 being hinged to the hub 2 via a conventional hinge. The hinges of the blades 4 define a plane that is referred to as the fastening plane P1, for convenience.

The hub 3 then drives the blades 4 in rotation about an axis of rotation AX. Furthermore, during its rotary motion about the axis of rotation, each blade may pivot about a lead-lag axis AX1, the lead-lag movements of the blades possibly giving rise to rotor unbalance that can lead to a phenomenon of ground resonance or to a phenomenon of air resonance, for example.

Under such circumstances, the rotor 2 is provided with a damper device 10 in order at least to minimize any risk of the above-mentioned phenomena appearing.

The damper device 10 comprises a ring 11 that is connected to each blade 4 by a lever 12. Each lever has a first end 12' hinged to the ring 11, e.g. by a first mechanical connection 20, and extends therefrom to a second end 12" hinged to the blade 4, e.g. by a second mechanical connection 200. For example, the second mechanical connection is provided with a ball joint fastened to an attachment of a blade, the second mechanical connection being offset relative to the lead-lag axis AX1 about which the blade 4 performs lead-lag movements.

The ring is then capable of movement with one degree of freedom in rotation and two degrees of freedom in translation in a plane parallel to the fastening plane P1, i.e. parallel to the fastening plane P1 or lying in the fastening plane P1.

In order at least to reduce the risk of a ground resonance phenomenon or an air resonance phenomenon appearing, for example, the damper device 10 includes damper means 30 (not visible in FIG. 1) common to all of the blades, and thus not one damper means per blade nor a plurality of inter-blade damper means.

The damper means 30 does not possess a degree of freedom to move in rotation. Since it is fastened to non-rotary fastener means 40 secured to the airframe 6, the damper means 30 comprise non-rotary means, unlike the ring 11.

Under such circumstances, the damper device 10 includes an interface 50 interposed between the ring 11 and the damper means 30, which interface 50 has a rotary member secured to the ring 11 and a non-rotary member secured to the damper means 30.

Consequently, if all of the blades perform the same lead-lag motion, then the levers 12 turn the ring 11 about its axis of symmetry. This collective rotary motion of the blades does not give rise to movement in rotation of the damper means 30, which means are therefore not stressed thereby.

Conversely, with reference to FIGS. 2 and 3, if the blades 4 perform distinct lead-lag movements, then the levers 12 cause the ring 11 to move in translation. The rotary lead-lag movements of the blades 4 are then converted into movements in translation acting on the damper means 30. The damper means 30 then provide the stiffness and/or damping that serves at least to reduce the risks of a ground resonance phenomenon or an air resonance phenomenon appearing, for example.

By way of example, and with reference to FIG. 3, if the advancing blade 4' and the retreating blade 4" perform lead-lag movements as represented by arrows F1, and if the other blades are in their middle positions, two blades are performing lead-lag movements that are distinct. As a result, the ring 11 is moved in translation as shown by arrow F2, thereby acting on the damper means 30.

It should be understood that the term "converting a rotary movement of a blade transmitted to a lever into a movement in translation" is used to mean converting non-collective lead-lag rotary movements of the blades of a rotor, given that two distinct blades of the rotor are performing two different lead-lag movements.

FIG. 4 is a section of FIG. 1 explaining a first embodiment of the damper device, and therefore also of the associated rotor and aircraft.

With reference to FIG. 4, the interface 50 comprises a rolling bearing having a first cage 52 and a second cage 54 between which rolling members 53 move. By way of example, the bearing may be a ball bearing or a roller bearing.

The first cage 52 then has the rotary member of the interface 50 secured to the ring 11, the second cage 54 being secured to the non-rotary member 51 that is secured to damper means 30.

As a result, the damper means comprise at least one layer of damper material, such as a viscoelastic material forming part of the group of elastomers, for example.

By way of example, the damper means 30 include at least one elastomer annulus 31, 32 parallel with the ring 11, each annulus being secured to the second cage 54 and non-rotary fastener means 40.

In the example shown, the damper means 30 may possess a top annulus 31 and a bottom annulus 32 that are arranged on either side of the ring 11 in elevation, the top annulus 31 being above the ring 11, and the ring 11 being above the bottom annulus 32. This configuration enables the damper device 10 to be well balanced so that the damper device does not give itself give rise to unbalance.

In another aspect, it should be observed that it is advantageous to center the damper means on the axis of rotation AX of the rotor, e.g. by centering each annulus of the damper means on the axis of rotation AX.

Furthermore, in order not to be set into rotation, in particular about the axis of rotation AX of the rotor 2, the fastener member 40 is secured to the airframe 6.

Since the airframe 6 has a main gearbox 5 interposed between a power plant and the rotor 2, it is advantageous for the fastener member 40 to be provided with a pole 41 that is attached to the casing 5' of the main gearbox 5. For example, the pole 41 of the fastener member 40 may be secured to the bottom of the main gearbox 5.

The pole 41 then passes through at least one plate 3' of the hub 3 in order to reach the airframe 6, with a ball or rolling bearing 3''' being interposed for example between the pole 41 and the plate through which it passes.

Furthermore, the pole 41 includes shoulders 42 and 43 secured to the annuluses 31 and 32 of the damper means 30, said annuluses surrounding the pole 41.

It should be observed that the pole 41 may be made up of a plurality of members, as in the variant shown.

According to another aspect, each first mechanical connection 20 connecting the first end 12' of a lever to the ring 11 may have an arm 11' projecting from the ring 11.

In a first variant as shown in particular in FIGS. 1 and 4, the first mechanical connection includes a single ball joint for connecting the first end 12' of a lever to the ring 11, e.g. a ball joint co-operating with said first end 12' and with a projecting arm 11' of the ring 11.

With reference to FIG. 4, when the ring is contained in a plane P2 parallel to the fastening plane P1 but distinct from the fastening plane P1, then the lever 12 may also present an angle of inclination.

With reference to FIG. 5, the first mechanical connection 20 may then include a rocker member 22 e.g. hinged by a ball joint to the first end 12' of a lever 12, together with a connecting rod 21 hinged to the rocker member 22 and to the ring 11, e.g. via two respective ball joints.

As shown in FIG. 6, the rocker member 22 may be arranged on a peg of the hub 3, the rocker member 22 extending in an elevation direction substantially perpendicular to the fastening plane P1 and to the plane P2 containing the ring 11.

Furthermore, the hub 3 may have a single plate with the ring 11 of the damper device being located above it.

Nevertheless, with reference to FIGS. 7 and 8, and in particular with reference to FIG. 8, the hub 3 may posses a bottom plate 3' and a top plate 3" with the hinges 4' that fasten the blades 4 being arranged between them so as to define a fastening plane P1.

The ring 11 may then be arranged in the fastening plane P1 inside the hub 3 with arms 11' of the ring 11 projecting from the hub 3 via lateral openings to join the levers 12.

Naturally, the present invention may be subjected to numerous variations as to its implementation. Although several embodiments are described, it will readily be understood that it is not conceivable to identify exhaustively all possible embodiments. Most of the figures are drawn for an embodiment involving a rotor having three blades. Clearly the present invention may be applied regardless of the number of blades. It is naturally possible to envisage replacing any of the means described by equivalent means without going beyond the ambit of the present invention.

Furthermore, FIGS. 4 and 8 show damper means that are annular in shape. Nevertheless, with reference to FIG. 9, it is possible for the damper means to be cylindrical in shape.

What is claimed is:

1. A damper device for a rotor having a rotary ring and a plurality of levers, each lever extending from a first end connected to the ring by a first mechanical connection to a second end suitable for being hinged to a blade, wherein the damper device includes non-rotary damper means secured to non-rotary fastener means and to a non-rotary member of an interface, the interface being interposed between the non-rotary damper means and the ring to convert a rotary lead-lag movement of a blade transmitted to a lever into a movement in translation acting on the damper means.

2. A damper device according to claim 1, wherein the interface includes a rolling bearing provided with a first cage constrained to rotate with the ring and a second cage that is not rotary, representing the non-rotary member secured to the damper means, rolling members being arranged between the first cage and the second cage.

3. A damper device according to claim 1, wherein the damper means comprise at least one viscoelastic member.

4. A damper device according to claim 1, wherein the damper means comprise at least one damping annulus, the annulus being arranged between the interface and the non-rotary fastener means.

5. A damper device according to claim 4, wherein the annulus is parallel to the ring.

6. A damper device according to claim 4, wherein the damper means comprise a top annulus and a bottom annulus that are arranged on either side of the ring in elevation, the top annulus being above the ring.

7. A damper device according to claim 1, wherein at least one mechanical connection comprises an arm for projecting radially from the ring.

8. A damper device according to claim 1, wherein at least one mechanical connection comprises a connecting rod hinged to the ring and a rocker member hinged to the connecting rod and to the first end of a lever.

9. A rotor provided with a hub carrying a plurality of blades to rotate about an axis of rotation (AX) in elevation, the blades being hinged to the hub by hinges arranged in a fastening plane, wherein the rotor includes the damper device according to claim 1 and provided with a ring rotatable about the axis of rotation (AX) and with one lever per blade, each lever extending from a first end connected to the ring by a first mechanical connection to a second end hinged to a blade, the non-rotary damper means being not rotary about the axis of rotation (AX), the interface being interposed between the damper means and the ring in order to convert rotary lead-lag movement of at least one blade into movement in translation acting on the damper means.

10. The rotor according to claim 9, wherein the ring is parallel to the fastening plane.

11. The rotor according to claim 9, wherein the hub has a top plate and a bottom plate for carrying the blades in the fastening plane (P1), and the ring is arranged in the fastening plane (P1).

12. The rotor according to claim 9, wherein the damper means are centered on the axis of rotation (AX) of the rotor.

13. An aircraft comprising an airframe and a rotor provided with a hub carrying a plurality of blades to rotate about an axis of rotation (AX) in elevation, the blades being hinged to the hub by hinges that are arranged in a fastening plane (P1), wherein the rotor includes the damper device according to claim 1 and a ring rotatable about the axis of rotation (AX) and with one lever per blade, each lever extending from a first end connected to the ring by a first mechanical connection to a second end hinged to a blade, the non-rotary fastener means being fastened to the airframe and to the non-rotary member of the interface, the interface being interposed between the damper means and the ring in order to convert rotary lead-lag movement of at least one blade into movement in translation in a plane parallel to the fastening plane (P1).

14. The aircraft according to claim 13, wherein the airframe includes a main gearbox driving the hub in rotation about the axis of rotation (AX), the fastener means comprising a pole fastened to a casing of the main gearbox.

* * * * *